April 1, 1930.  C. DABNEY  1,753,110
DIRECTION SIGNAL
Original Filed Oct. 31, 1928  2 Sheets-Sheet 1
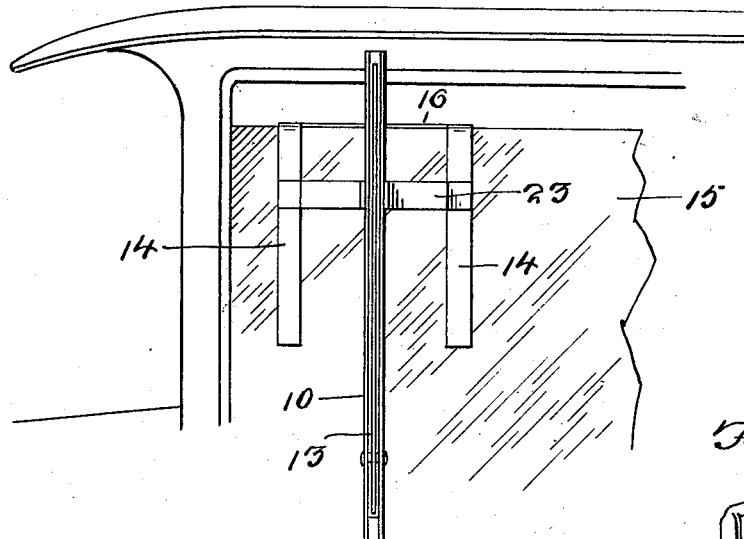
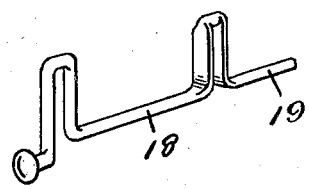
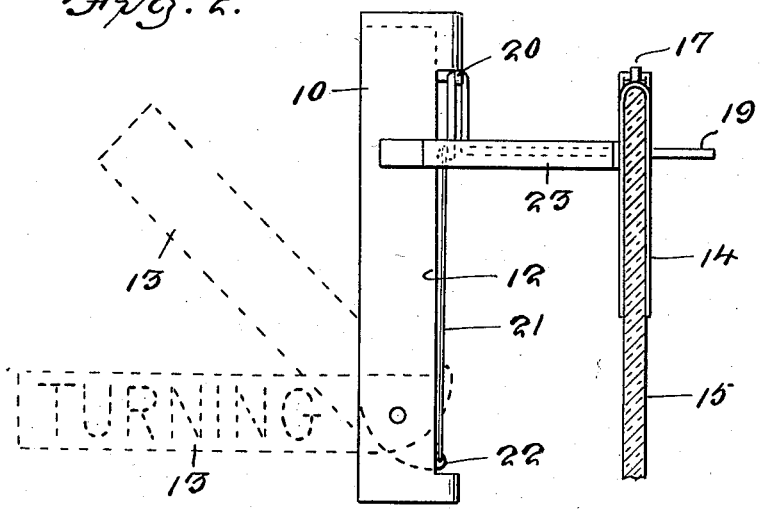
Conway Dabney
INVENTOR
BY Victor J. Evans
ATTORNEY April 1, 1930.                C. DABNEY                1,753,110
                            DIRECTION SIGNAL
                    Original Filed Oct. 31, 1928    2 Sheets-Sheet 2
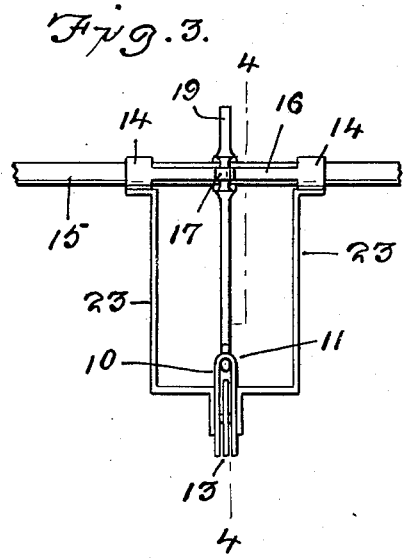
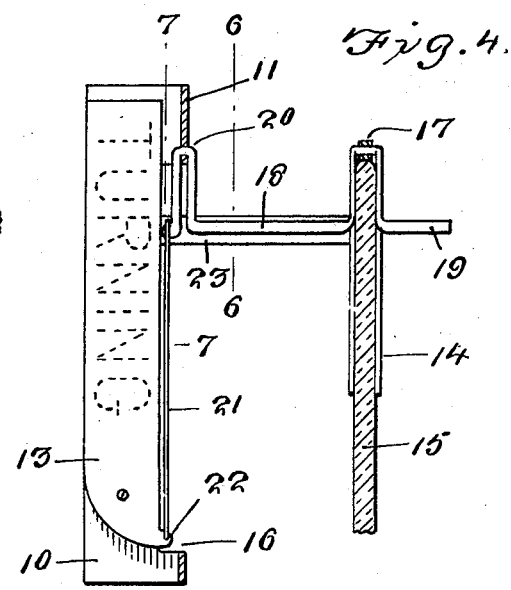
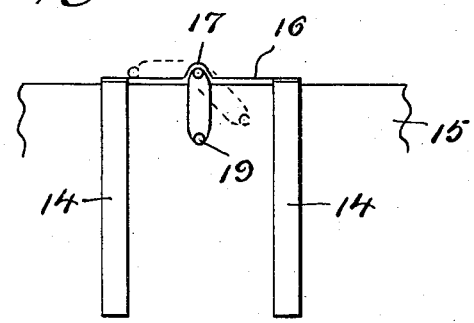
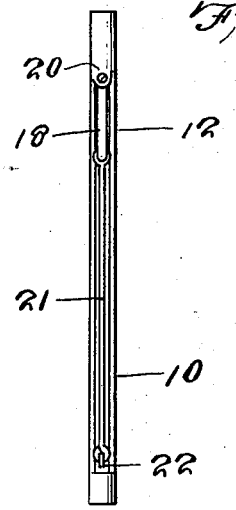
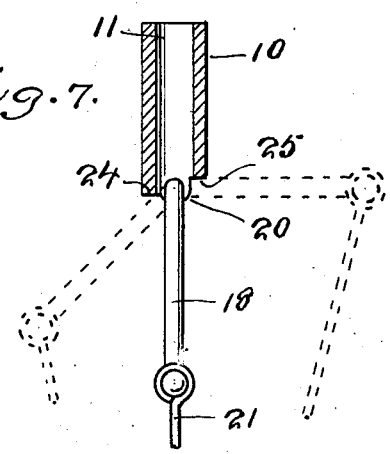
Conway Dabney
INVENTOR
BY Victor J. Evans
ATTORNEY Patented Apr. 1, 1930

1,753,110

UNITED STATES PATENT OFFICE

CONWAY DABNEY, OF CRYSTAL SPRINGS, MISSISSIPPI

DIRECTION SIGNAL

Application filed October 31, 1928, Serial No. 316,208. Renewed August 24, 1929.

This invention relates to improvements in direction signals for vehicles, and has for an object the provision of a signal which may be operated from within a closed automobile for the purpose of indicating proposed changes in direction of travel.

Another object of the invention is the provision of a signal which may be readily attached to or removed from a vehicle, means being provided for attaching the signal to the glass panel of an automobile window, the construction permitting of the use of the signal with the window in either an open or closed position.

Another object of the invention is the provision of means for operating the signal so as to indicate either a right or left turn, means being provided whereby this may be accomplished without diverting the attention of the driver from traffic.

With the above and other objects in view, the invention further includes the following novel features and details of construction, to be hereinafter more fully described, illustrated in the accompanying drawings and pointed out in the appended claims.

In the drawings:—

Figure 1 is a fragmentary side view showing a portion of an automobile with the invention applied.

Figure 2 is a side elevation of the signal showing the window glass of the automobile in section.

Figure 3 is a top plan view of the subject matter of Figure 2.

Figure 4 is a section on the line 4—4 of Figure 3.

Figure 5 is a fragmentary elevation showing the device mounted upon a window glass and looking at the inner face of the glass.

Figures 6 and 7 are sections taken respectively on the lines 6—6 and 7—7 of Figure 4, the last referred to figure being on an enlarged scale.

Figure 8 is a detail perspective view of the crank rod.

Referring to the drawings in detail wherein like characters of reference denote corresponding parts, the invention as shown comprises a housing 10 which includes spaced side walls, and a rear wall 11, the latter being cut away as shown at 12 for a purpose to be hereinafter apparent.

Pivotally mounted within the housing 10 is a signal arm 13 which may have thereon any suitable indicia, for example, "Turning."

For the purpose of detachably securing the signal in position for use, the invention provides a pair of substantially U-shaped members 14 which are adapted to engage over the upper edge of the glass panel 15 of an automobile window. These members 14 are constructed of thin metal so that they may enter the groove at the top of the window opening and permit the signal to be used with the window either open or closed. A thin bar of metal 16 connects the members 14 and holds them properly spaced, and in addition, this bar provides a bearing 17 for a crank rod 18, one end of which provides a handle 19. This crank arm also has a bearing in the rear wall 11 of the housing 10 as shown at 20 and its outer end has pivotal connection with one end of a rod 21. The opposite end of this rod is pivotally connected to an eye 22 at one end of the arm 13.

The housing is connected with the U-shaped members 14 by means of angle arms 23. The inner ends of these arms are secured to the U-shaped members 14 while their outer ends are secured to opposite sides of the housing 10 as shown in Figure 3 of the drawings.

In the use of the invention, the signal is attached in the manner shown in Figures 1, 2 and 4 of the drawings, the handle 19 being upon the inside of the vehicle. By turning the handle in one direction, the arm 13 will be moved pivotally downward and when in its extreme downward position, will indicate a left turn. By moving the handle 19 pivotally in the opposite direction, the arm 13 will be moved downward to an angle of substantially forty-five degrees as shown by the dotted lines in Figure 2 of the drawings. This will indicate a right hand turn.

In order to limit the degree of movement of the arm the housing is provided with a shoulder 24 in one of its side walls and with a shoulder 25 in its opposite side wall. These shoulders are formed by the cut away portions of the rear wall 11, the shoulder 24 being positioned to be engaged by the rod 18 to limit movement in one direction and prevent full downward movement of the arm 13 so that the signal will be positioned at substantially forty-five degrees to indicate a right turn. The stop 25 permits the arm 13 to move to a rightangular position to indicate a left turn.

Thus, the driver may, by moving the handle 19 in one direction, indicate a left turn and by moving the handle in an opposite direction he may indicate a right turn. It will not be necessary therefore for the driver to divert his attention from the operation of the car to operate the signal.

The invention is susceptible of various changes in its form, proportions and minor details of construction and the right is herein reserved to make such changes as properly fall within the scope of the appended claims.

Having described the invention what is claimed is:—

1. In a direction signal for automobiles, a signal device, a housing for said device, means to attach the housing to the outside of an automobile, a pivotally mounted operating rod having one end operatively connected with the signal device and its opposite end extending into the automobile, and means included in the housing to limit pivotal movement of the operating rod in opposite directions to regulate the degree of movement of the signal device and provide different signals.

2. In a direction signal for automobiles, a signal device, a housing for said device, means to attach the housing to the outside of an automobile, said means comprising spaced substantially U-shaped members adapted to engage over the upper edge of the glass of the automobile window, a spacing bar adapted to extend longitudinally of the upper edge of said glass with its opposite ends attached to said members, and arms extending laterally from the U-shaped members with their outer ends secured to the housing, and means to operate the signal.

3. In a direction signal for automobiles, a signal device, a housing for said device, means to attach the housing to the outside of an automobile, said means comprising spaced substantially U-shaped members adapted to engage over the upper edge of the glass of the automobile window, a spacing bar adapted to extend longitudinally of the upper edge of said glass with its opposite ends attached to said members, and arms extending laterally from the U-shaped members with their outer ends secured to the housing, a crank rod mounted in bearings provided in the housing and in said spacing bar and having one end adapted to extend into the automobile, and means connecting the other end of the rod with the signal device, whereby rotation of the crank rod will operate said signal device.

4. In a direction signal for automobiles, a signal device, a housing for said device, means to attach the housing to the outside of an automobile, a pivotally mounted operating rod having one end operatively connected with the signal device and its opposite end extending into the automobile, spaced stops provided upon the housing upon opposite sides of and in the path of the operating rod to limit movement of said rod in opposite directions, and said stops being spaced to provide a different degree of movement in each direction to provide different signals.

In testimony whereof I affix my signature.

CONWAY DABNEY.